(12) United States Patent
Song et al.

(10) Patent No.: US 8,441,751 B1
(45) Date of Patent: *May 14, 2013

(54) DIBIT PULSE EXTRACTION METHODS AND SYSTEMS

(75) Inventors: Hongwei Song, Longmont, CO (US); Zining Wu, Los Altos, CA (US); Jingfeng Liu, Longmont, CO (US); Toai Doan, Saratoga, CA (US)

(73) Assignee: Marvell International Ltd., Hamilton (BM)

( * ) Notice: Subject to any disclaimer, the term of this patent is extended or adjusted under 35 U.S.C. 154(b) by 1669 days.

This patent is subject to a terminal disclaimer.

(21) Appl. No.: 11/840,682

(22) Filed: Aug. 17, 2007

Related U.S. Application Data

(60) Provisional application No. 60/822,830, filed on Aug. 18, 2006.

(51) Int. Cl.
*G11B 5/09* (2006.01)

(52) U.S. Cl.
USPC .............. 360/45; 360/25; 360/26; 360/31; 360/65

(58) Field of Classification Search ............... None
See application file for complete search history.

(56) References Cited

U.S. PATENT DOCUMENTS

| | | | | |
|---|---|---|---|---|
| 5,781,358 | A * | 7/1998 | Hasegawa | 360/51 |
| 6,208,477 | B1 * | 3/2001 | Cloke et al. | 360/31 |
| 6,222,691 | B1 * | 4/2001 | Berquist et al. | 360/46 |
| 6,363,102 | B1 * | 3/2002 | Ling et al. | 375/147 |
| 6,904,104 | B1 * | 6/2005 | Khullar et al. | 375/332 |
| 7,170,704 | B2 * | 1/2007 | DeGroat et al. | 360/53 |
| 7,616,707 | B2 * | 11/2009 | Jin | 375/316 |
| 7,643,238 | B2 * | 1/2010 | DeGroat | 360/65 |
| 7,760,821 | B2 * | 7/2010 | Cherubini et al. | 375/340 |
| 2001/0006533 | A1 * | 7/2001 | Kubo et al. | 375/232 |
| 2002/0080898 | A1 * | 6/2002 | Agazzi et al. | 375/355 |
| 2003/0028833 | A1 * | 2/2003 | Coker et al. | 714/709 |
| 2006/0181797 | A1 * | 8/2006 | Sugawara et al. | 360/51 |
| 2007/0047120 | A1 * | 3/2007 | DeGroat | 360/39 |

FOREIGN PATENT DOCUMENTS

WO    WO 2008059406 A1 *    5/2008

* cited by examiner

*Primary Examiner* — Dismery Mercedes

(57) ABSTRACT

A receiving device may be configured to derive an oversampled dibit pulse response estimate using symbols sampled at substantially the read channel symbol rate of the receiving device. The receiving device may include a data acquisition circuit configured to digitize data derived from a memory medium, a symbol timing loop and read circuit, as well as a dibit pulse estimation circuit configured to estimate the oversampled dibit pulse response using symbols sampled at the read channel rate of the receiving device without disturbing the symbol timing loop and read circuit.

29 Claims, 6 Drawing Sheets

DIBIT PULSE EXTRACTION METHODS AND SYSTEMS

INCORPORATION BY REFERENCE

This application claims priority under 35 U.S.C. §119(e) from U.S. Provisional Application Ser. No. 60/822,830 entitled "Oversampled Dibit Pulse Extraction", filed on Aug. 18, 2006, incorporated by reference herein in its entirety.

BACKGROUND

The manufacturers of magnetic hard-disk drives (HDDs) are constantly under pressure to increase both performance and data storage density. Unfortunately, HDDs having high linear recording densities tend to suffer from nonlinear and linear distortions in their read/write channels, which may lead to significant performance degradation.

An approach used to identify such nonlinear distortion in HDDs is referred to as "dibit pulse extraction." As dibit pulse extraction may be used to identify nonlinear and linear distortions, it may therefore be used to minimize their effects. For example, dibit pulse extraction may be used to determine the write precompensation and channel equalization that may optimize the bit-error-rate (BER) performance of an HDD.

Current dibit pulse extraction techniques can require a sampling clock significantly higher than an HDD's read/write channel clock. Given that HDDs may have channel clocks running at data rates of 2 Gbps or higher, it may not be practical to integrate the current dibit pulse extraction techniques into an HDD's read channel. Generally, a separate analyzer with a very high sampling clock is used to measure an HDD's distortions, which may be both expensive and difficult to implement via monolithic or hybrid integration.

SUMMARY OF THE DISCLOSURE

In various embodiments, a receiving device, such as an HDD, may be configured to estimate an oversampled dibit pulse response. The receiving device may include a data acquisition circuit configured to digitize data derived from a memory medium, as well as a dibit pulse estimation circuit configured to estimate the oversampled dibit pulse response using symbols sampled at substantially the read channel symbol rate of the receiving device. That is, instead of using a very high frequency sampling clock, a sampling device, such as a sample and hold circuit, may operate at the symbol-rate but the sampling phase may be shifted to controlled phase angles. A compensation filter can eliminate the phase shift after the sampler so a symbol timing loop and read circuit, i.e. a closed-loop read circuit, is not perturbed. In this way, oversampling of a receiving device's dibit pulse response may be achieved without increasing sampling frequency or perturbing the closed-loop read circuit.

BRIEF DESCRIPTION OF THE DRAWINGS

The memory-related devices and methods are described with reference to the following figures, wherein like numerals reference like elements, and wherein.

DETAILED DESCRIPTION OF EMBODIMENTS

Figure 1:
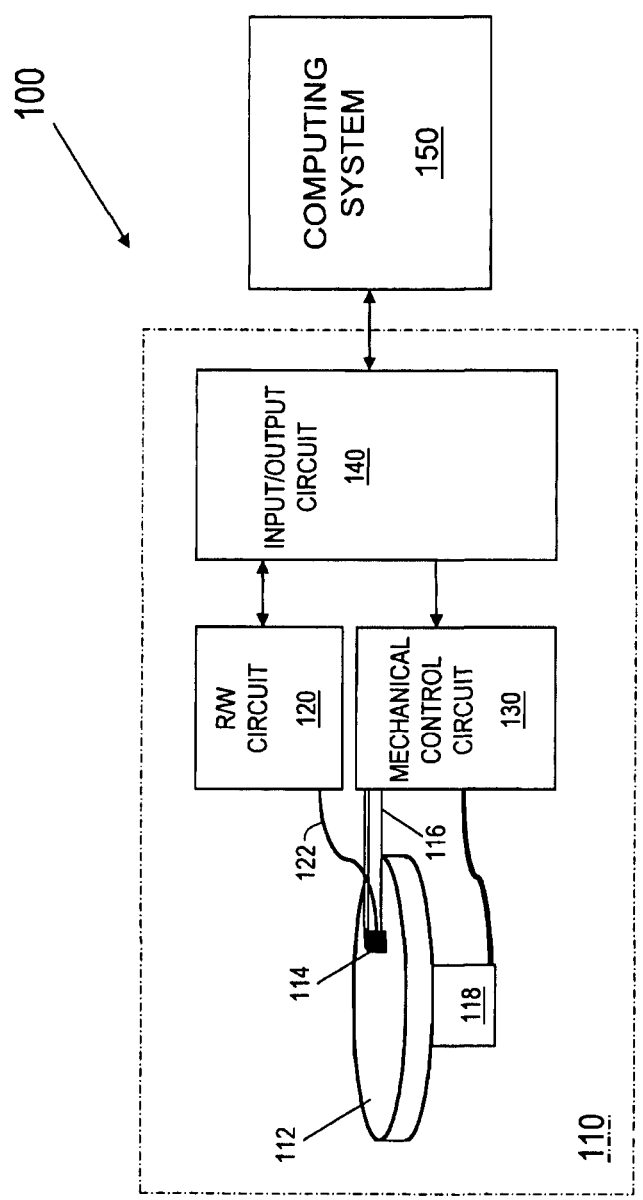
FIG. 1 is a block diagram of an exemplary data manipulation system.

FIG. 1 is a block diagram of an exemplary data manipulation system 100. As shown in FIG. 1, data manipulation system 100 includes a computing system 150 with a data storage system 110. The data storage system 110 includes a disk-shaped memory medium 112 spun by a motor 118 that may be written to and read from using transducer 114 held by armature 116. The data storage system 110 further includes a read/write circuit 120 coupled to transducer 114, a mechanical control circuit 130 coupled to both motor 118 and armature 116, and an input/output circuit 140. While a data storage system is discussed below by way of example and explanation, it should be appreciated that the channel estimation techniques discussed herein may be applied elsewhere, such as any number of communication systems having a receiving channel.

In operation, computing system 150 may store or retrieve data in data storage system 110 using any number of known or later developed commands and/or interface standards. For example, computing system 150 may retrieve data stored on memory medium 112 by issuing a command to input/output circuit 140 via a universal serial bus (USB) cable, for example. In response, input/output circuit 140 may cause mechanical control circuit 130 to move transducer 114 to a specific location on memory medium 112, and further cause read/write circuit 120 to extract and forward data sensed by transducer 114, which then may be passed to computing system 150.

In order to improve the performance of data storage system 110, as well as the data storage density of memory medium 112, it may be useful to estimate and compensate for nonlinear distortion and inter-symbol interference (ISI) in the read channel of data storage system 110. Generally, compensating for ISI in data storage system 110 may require some form of channel estimation and equalization of its read channel.

Figure 2:
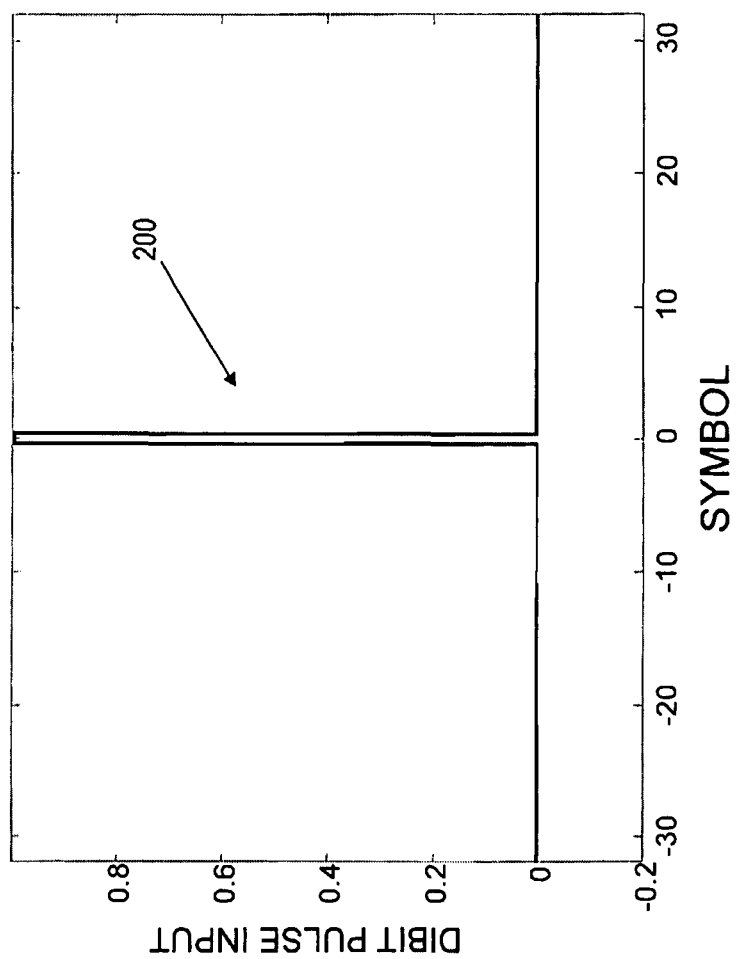
FIG. 2 is a timing diagram of an exemplary dibit pulse.

One form of channel estimation is known in the art as "dibit pulse response estimation" A dibit pulse may be thought of as two consecutive step responses, e.g., 0-to-1 and 1-to-0, typically separated by a single symbol length. FIG. 2 depicts an exemplary input dibit pulse 200 where a first data bit causes pulse 200 to rise from 0 to 1, and a second bit causes pulse 200 to fall from 1 to 0 after one symbol period. A response to an input dibit pulse can be called the dibit pulse response. In other words, a dibit pulse response is the response to a pair of transitions at minimum separation.

Figure 3:
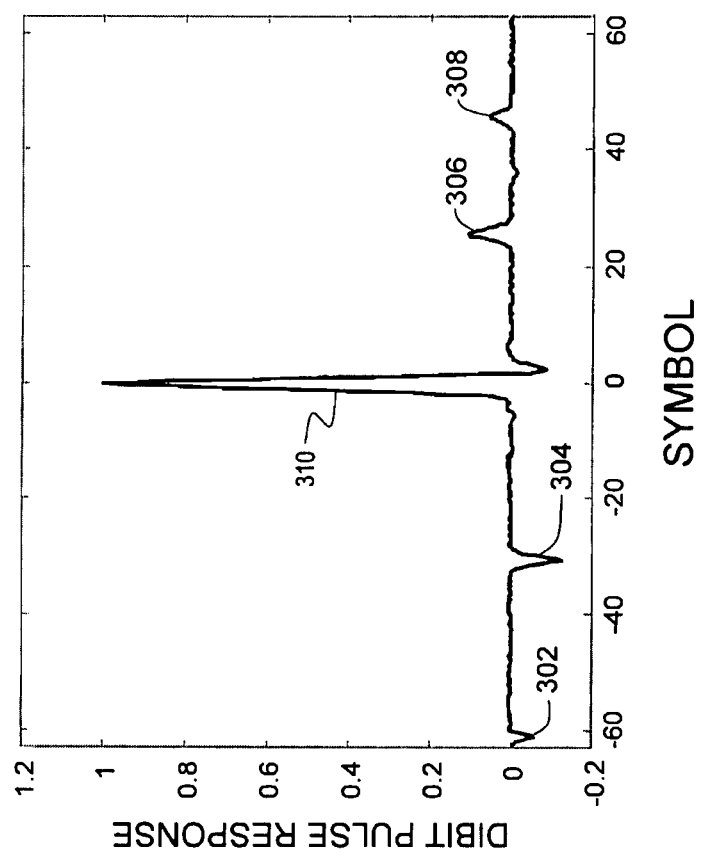
FIG. 3 is a timing diagram of an exemplary dibit pulse response for a read channel of the data storage device of FIG. 1.

Continuing to FIG. 3, an exemplary dibit pulse response 300 for the input dibit pulse 200 of FIG. 2 is depicted. As shown in FIG. 3, dibit pulse response 300 may include a large central pulse 310 with undershooting at the base of pulse 310, as well as a number of impairments or echoes 302, 304, 306 and 308 that can be caused by read channel effects, including nonlinear distortion, such as nonlinear transition shifts (NLTSs), overwrite distortion, and nonlinear bit interactions, and linear distortion, such as bandwidth limitations, spectral shape (i.e. peaks and valleys) and phase distortion. As may be recognized by one of ordinary skill in the art, the distortion of pulse 310 and impairments 302-308 may degrade the performance of a data storage device.

The effects of these impairments in a read channel may be eliminated or reduced by estimating the nonlinear and linear distortion of the read channel, then using the estimates to compensate for these effects. Generally, conventional approaches to estimating a dibit pulse response may involve the use of expensive, specialized, high-speed external instrumentation, which may need access to sensitive nodes within a read circuit. Such instrumentation may need to digitize numerous stored symbols at many times the read channel's symbol rate to provide oversampled, i.e., more than one sample per symbol, dibit pulse response estimate In contrast to traditional dibit pulse estimation techniques, the exemplary data storage system 110 may be configured to estimate an oversampled dibit pulse response of its read channel using specialized circuitry integrated within its internal read channel circuitry (not shown in FIG. 1) while sampling the read channel at the normal, i.e. operational, symbol rate of the data storage system and while not perturbing a symbol timing loop and read circuit This may allow for increased performance at lower costs as no external instrumentation or higher-speed analog-to-digital converters (ADCs) may be required.

Figure 4:
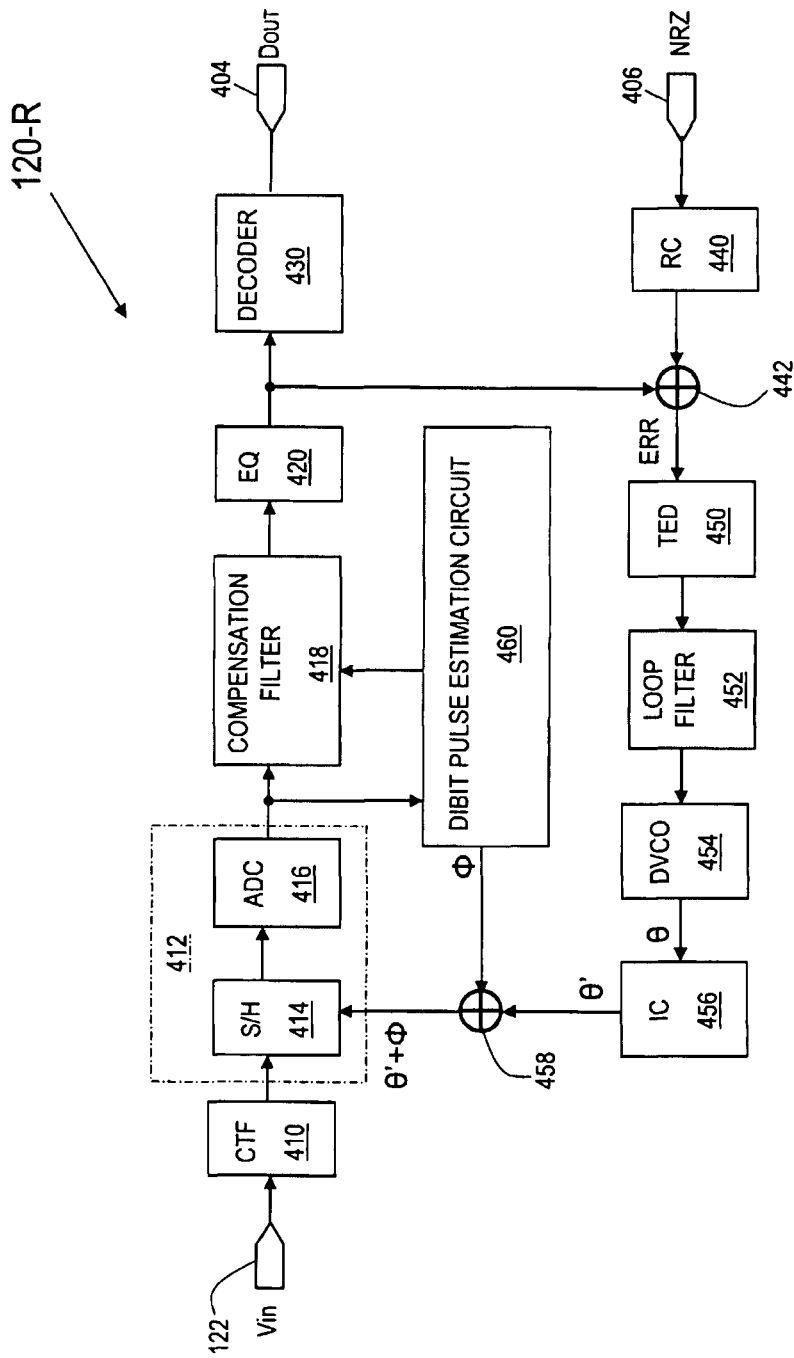
FIG. 4 is a block diagram of an exemplary closed-loop read circuit for use in the data storage device of FIG. 1 capable of estimating an oversampled dibit pulse response.

FIG. 4 is a block diagram of an exemplary read channel circuit 120-R having a closed-loop structure for use in the data storage device of FIG. 1 that is capable of estimating an oversampled dibit pulse response. As shown in FIG. 4, read channel circuit 120-R includes a continuous time filter (CTF) 410, a data acquisition system 412 having a sample and hold (S/H) circuit 414 and an ADC 416, a compensation filter 418, an equalizer 420, a decoder 430a reconstruction circuit (RC) 440, a first summing junction 442, a timing error detector (TED) 450, a loop filter 452, a digital voltage controlled oscillator (DVCO) 454, an interpolation circuit (IC) 456, a second summing junction 458, and a dibit pulse estimation circuit 460.

Read channel circuit 120-R may be described as having at least two different modes of operation including: (1) a normal/operational read mode where read channel circuit 120-R may be used to extract and export data from a memory medium; and (2) an estimation mode where read channel circuit 120-R may be used to estimate an oversampled dibit pulse response of its read channel.

During the normal read mode of operation, compensation filter 418, second summing junction 458, and dibit pulse estimation circuit 460 may generally not be used, or perhaps used in a way that has little or no effect on read channel circuit 120-R. As CTF 410, data acquisition system 412, EQ 420, decoder 430, RC 440, first summing junction 442, TED 450, loop filter 452, DVCO 454, and IC 456 are known components that together compose a known form of read channel circuit, their functionality will not be discussed except to the extent that they interact with compensation filter 418, second summing junction 458 and dibit pulse estimation circuit 460 in the estimation mode.

During the estimation mode of operation, an analog channel's signal, such as the signal from a magneto-resistive transducer, may be received by CTF 410 via node 122. CTF 410 may remove unwanted frequency components from the received signal to provide a filtered output signal to S/H circuit 414. S/H circuit 414 may periodically sample the filtered signal, and ADC 416 may digitize the sampled signal provided by S/H circuit 414.

In various embodiments, it may be advantageous to estimate the dibit pulse response of the read channel using a special data sequence known as a maximal length pseudo-random binary sequence (PRBS). A PRBS is a sequence of bits that, while deterministic and repeatable, behaves statistically as a random bit sequence. A maximal length PRBS sequence for a q-bit long register contains $2^q-1$ states. For example, a 7 bit register can generate a maximal length PRBS sequence of states: 1 through 127; the all-zero state is excluded.

A PRBS can serve as a useful stimulus for measuring both linear and nonlinear distortion. A PRBS can be used to initialize or train an adaptive equalizer, and thus compensate ISI due to linear distortion. A cross-correlator can extract a system's dibit pulse response to a maximal length PRBS stimulus because the autocorrelation of a maximal length PRBS closely approximates an input dibit pulse.

In order to estimate the dibit pulse response of a read channel for a particular memory system, a PRBS may be first written to the memory system's storage medium. Subsequent reads of the response to the PRBS stimulus may be used to provide an advantageous signal from which to estimate the response of the read channel. Note that for non-storage related methods and systems, the PRBS may be transmitted from any number of transmitting devices to be received by some read channel, which may take any number of forms, such as a combination of optical conduits, transducers, amplifiers and electrical conduits.

While a single repetition of a PRBS on a storage medium may be useful, it may be further useful to write multiple copies of the PRBS in order to provide better read channel estimates. For example, by writing a 127-bit PRBS one-hundred times to a memory medium, and then reading and appropriately averaging the received samples or PRBS ADC samples, the effects of random noise may be practically eliminated from the channel estimation process. Note that while practically any number of PRBS copies may be written, as will be explained below it may be useful to use powers of 2, i.e., $2^N=2, 4, 8, 16, 32, 64$ etc. in order to simplify processing and/or hardware. Still further, given that many devices read and write in sector-level increments, it may be advantageous to use as much of a memory medium's sector as possible. For example, for an HDD having a sector of 4,096 bits it may be useful to use a 127-bit PRBS repeated 32 times.

Periodic sampling can provide higher resolution or oversampling of a periodic signal. In periodic sampling, a repeating or periodic signal can stimulate a system and the sample phase can be adjusted to interrogate different parts of the system's response. The sampler can operate synchronously with the periodic signal so the same point in the response can be sampled at each repetition. In the case of a PRBS stimulus, the period is understood to be the sequence period, not the bit period. More than one sample can be taken per period If samples of a periodic signal are received at the symbol rate 1/T, where T is the sampling period, the samples of a response h(t) are h(kT) are h[k]. Naturally, h[k] represents h(t) only at the sample points, i.e. at a time resolution of T. The effective time resolution can be decreased, i.e. the effective sampling rate can be increased, to oversample the channel pulse response by sampling at various controlled phases. For example, if one set of samples is taken at zero phase (i.e., at t=kT), and a second set of samples is taken at 180 degrees phase (i.e., at t=(k+0.5)T), then interleaving the two sampled sequences can double the effectively sampling rate.

In the exemplary embodiment of FIG. 4, the sample timing of S/H circuit 414 may be provided by second summing junction 458, which is configured to receive an interpolated symbol timing signal θ' from interpolation circuit 456's interpolation of symbol timing signal θ from DVCO 454 and a phase offset angle Φ produced by dibit pulse estimation circuit 460. The range of the phase offset angle Φ of S/H circuit 414 may vary from 0 radians to 2π radians, i.e., it may be modulo-$2\pi$, but can be represented by an integer. The resolution of phase offset angle $\Phi$ may be set such that $\Phi = m \cdot 2\pi/N$ where N is a positive integer equal to a desired oversampling rate, and m is an integer such that $0 \leq m \leq M$. For example, assuming that four-fold oversampling is desired, N may be set to 4 while $\Phi$ may be set to any of $\{0, \pi/2, \pi, 3\pi/2\}$. The oversampling rate can be an integer, such as N=2 or N=4, or can be a ratio of integers, such as N=15/7 or 31/8.

For systems that represent angles using integer values, various phase offset angles may need to be set accordingly. For example, for a system that represents a span of 0 radians to $2\pi$ radians using a seven bit integer (0 to 127), i.e. divides the principal plane into M=128 equal angle increments, phase offset angle $\Phi$ may be set to $\{0, 32, 64, 96\}$ to represent angles $\{0, \pi/2, \pi, 3\pi/2\}$ or equivalently, the relative symbol times of $\{0, M/4, M/2, 3M/4\}$, respectively.

Assuming that phase offset angle $\Phi=0$ radians, read circuit 120-R may operate normally in the sense that there is no phase shift that might cause the symbol timing loop of read circuit 120-R to malfunction. For example, if a phase offset angle other than zero radians is used, read circuit 120-R may not be able to correctly estimate received symbols and to lock onto an appropriate symbol rate. However, by enabling compensation filter 418 to compensate for various non-zero values of phase offset angle $\Phi$, the functionality of the closed-loop structure of read circuit 128-R, i.e. the symbol timing loop and read circuit, may be unhindered. For example, for various phase offset angles $\Phi=32(\pi/2)$, $64(\pi)$ and $96(3\pi/2)$ (i.e., non-zero phase offset angles), compensation filter 418 may perform an interpolation process to effectively reverse the non-zero phase offset angle thus allowing read circuit 120-R to properly function while S/H circuit 414 samples incoming symbols at different relative phase offset angles. In an exemplary case, compensation filter 418 can be a polyphase filter bank. In other words, compensation filter 418 can be a bank or array of subfilters, called polyphase filters, that are addressed sequentially to implement an interpolation filter. The phase of the polyphase filters can be the opposite of and therefore cancel or compensate the timing phase offset.

Note that while exemplary read circuit 120-R is applied to a data storage device, e.g., a magnetic HDD, many of the same concepts may be applied to certain communications systems. That is, while the exemplary embodiments of the present disclosure have particular applicability to HDDs and other memory storage devices, their functionality is not limited solely thereto. For example, in various embodiments read circuit 120-R may be applied to resolving channel impairments in a communications system where the read channel may take the form of a twisted-wire pair (or some other communications medium) and data packets may replace HDD sectors.

Figure 5:
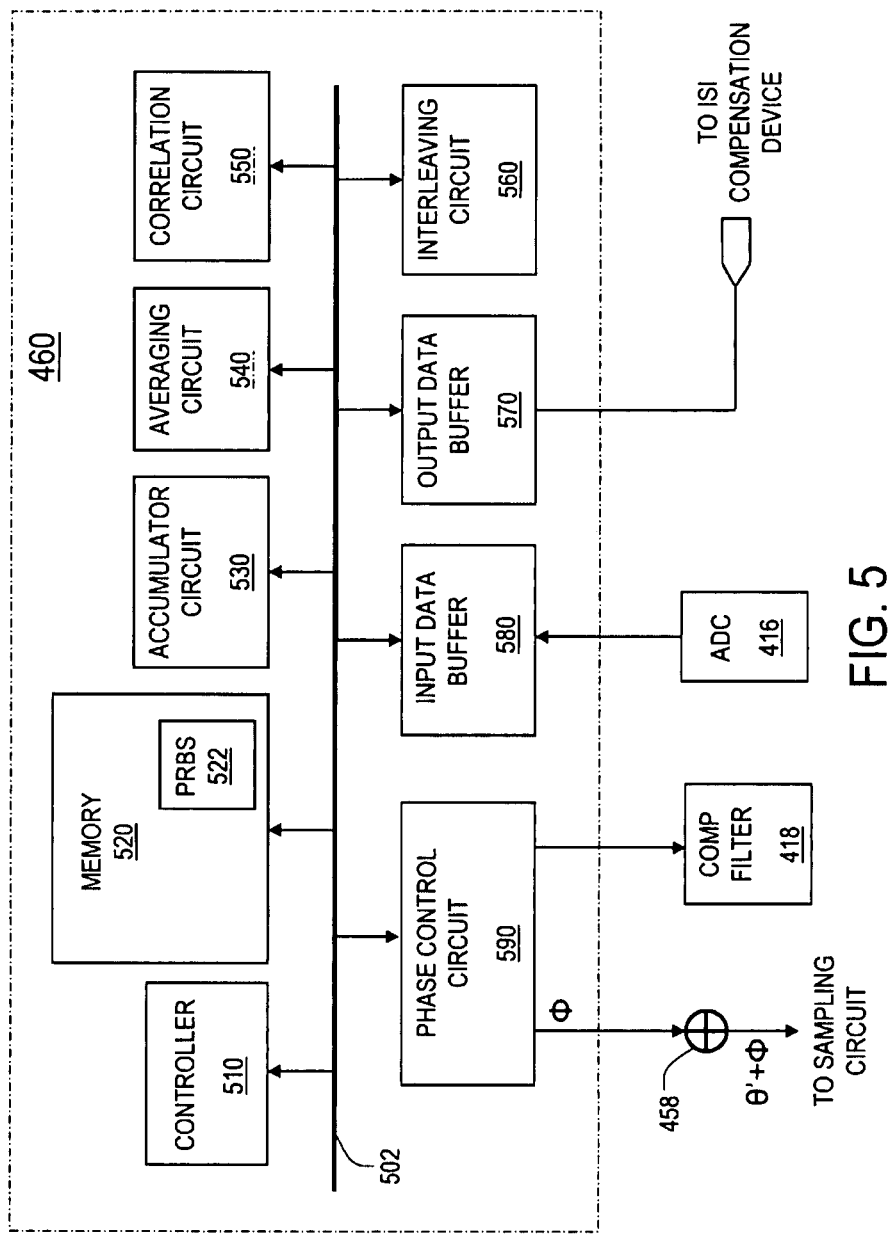
FIG. 5 is a block diagram of the exemplary dibit pulse estimation circuit of FIG. 4.

FIG. 5 is a block diagram of an exemplary embodiment of dibit pulse estimation circuit 460. As shown in FIG. 5, dibit pulse estimation circuit 460 includes a controller 510, a memory 520 storing a pseudo-random binary sequence (PRBS) 522, an accumulator circuit 530, an averaging circuit 540, a correlation circuit 550, an interleaving circuit 560, an output data buffer 570, an input data buffer 580 and a phase-control circuit 590. The various components 510-590 are coupled together via control/data bus 502.

Although the exemplary embodiment of dibit pulse estimation circuit 460 uses a bussed architecture, it should be appreciated that any other architecture may be used as well known to those of ordinary skill in the art. For example, in various embodiments, components 510-590 may take the form of separate electronic components coupled together via a series of separate busses or specialized interfaces. It also should be appreciated that some of the above-listed components may take the form of software/firmware routines residing in memory 520 to be executed by controller 510, or even software/firmware routines residing in separate memories to be executed by different controllers. Also note that while PRBS 522 may be stored in memory 520, in other embodiments PRBS 522 may be generated by controller 510, by some dedicated logic or received from an external device as may be found advantageous.

In operation and under control of controller 510, phase control circuit 590 may provide a first phase offset angle (typically $\Phi=0$ radians) to second summing junction 458. Phase control circuit 590 may also cause compensation filter 418 to use a set of parameter suitable to compensate for the first phase offset angle such that read circuit 120-R will appropriately operate.

Received or PRBS ADC samples of a response to a PRBS stimulus written to memory medium 112 (of FIG. 1) may be provided the input data buffer 580 from ADC 416., The PRBS ADC samples may be placed in memory 520 or directly in accumulator circuit 530. The PRBS ADC samples may be added and stored in respective memory locations within accumulator circuit 530 to integrate the response, which may include impairments, while not integrating random noise that is uncorrelated with the PRBS stimulus. For example, if a 127 bit PRBS stimulus is repeated 32 times for a single phase offset, the corresponding PRBS ADC samples of each repetition can be added together to produce a set of 127 sums. These sums can be called the accumulated or integrated dibit pulse response for the given phase offset Note that the minimum word size of each location of accumulator circuit 530 may be determined by the PRBS ADC sample sets read and the resolution of ADC 416. For example, if ADC 416 has an output resolution of 6 bits and 32 ($=2^5$) PRBS ADC sample sets are read, then each location of accumulator circuit 530 can have at least 11 bits to avoid possible loss of data. While exemplary accumulator circuit 530 uses internal memory locations to accumulate and store data, in various other embodiments accumulator circuit 530 may use memory 520 to store individual incoming samples and/or its sequence of sums.

Once the accumulator circuit 530 has accumulated the appropriate number of the PRBS ADC samples, the sum of each location within accumulator circuit 530 may be averaged by averaging circuit 540. While in some embodiments averaging circuit 540 may be some form of floating point or integer divider, in embodiments where $2^N$ ($=2, 4, 8, 16, 32$) sets of PRBS ADC samples are used, averaging circuit 540 may need to do little more than truncate the appropriate number of lower bits, thereby retaining the most significant bits. For instance, using the example above with the 11-bit accumulator circuit 530 and assuming that 6-bit resolution is desired, averaging circuit 540 can extract the most significant six bits of each entry while ignoring the remaining bits. Again note that an averaged PRBS sequence produced by averaging circuit 540 may be representative of a single, relatively noise-free set of PRBS ADC samples.

Next, correlation circuit 550 may perform a time-domain cross-correlation (or an equivalent frequency-domain convolution) on the averaged PRBS ADC sample sequence produced by averaging circuit 540 using PRBS 522 located in memory 520. The product of this cross-correlation may be a 127-bit dibit pulse response estimate of the read channel for a phase offset angle of $\Phi=0$. This 127-bit dibit pulse response estimate for $\Phi=0$ may then be stored in interleaving circuit 560 to await further processing.

Phase control circuit 590 may provide a second phase offset angle (e.g. $\Phi=\pi/2$ radians) to second summing junction 458 while causing compensation filter 418 to use a second set of parameters suitable to the second phase offset angle. The same PRBS ADC samples (or an equivalent set of PRBS ADC samples in another location) used for the first phase offset angle ($\Phi=0$ radians) may then be re-sampled by S/H circuit 414 at the new phase offset angle, digitized by ADC 416, fed to input data buffer 580 by ADC 416 as the received PRBS, and placed in memory 520 or accumulator circuit 530. Averaging circuit 540 and correlation circuit 550 may then derive a second 127-bit dibit pulse response estimate, which may be interleaved with the first 127-bit dibit pulse response estimate by interleaving circuit 560.

The process may then be repeated as necessary until interleaving circuit 560 (or a buffer memory controlled by interleaving circuit 560) holds an oversampled dibit pulse response estimate. For instance, using the examples above where N=4 such that $\Phi=\{0, \pi/2, \pi, 3\pi/2\}$ and the PRBS is 127 bits long, interleaving circuit 560 may produce a four-fold (508 point) oversampled dibit pulse response while sampling PRBS data at the symbol rate of the read channel. Note that while a single PRBS may be used for all phase offset angle values, in various embodiments it may be possible to use a different PRBS for each phase offset angle. For example, a first PRBS may be used for $\Phi=0$ while a second PRBS may be used for $\pi/2$, $\pi$ and $3\pi/2$.

Once an appropriate oversampled dibit pulse response estimate is derived, dibit pulse estimation circuit 460 can, via output data buffer 570, export the oversampled dibit pulse response estimate to any number of impairment compensating devices, such as a precompensation circuit, an erase circuit, a write current waveform circuit, a read head height circuit, an equalizer such as a decision feedback equalizer (DFE), a mean square error (MSE) equalizer, a least mean square (LMS) equalizer, an adaptive transversal filter, a Kalman filter, a least-squares or gradient lattice filter, Viterbi decoder, and the like.

Figure 6:
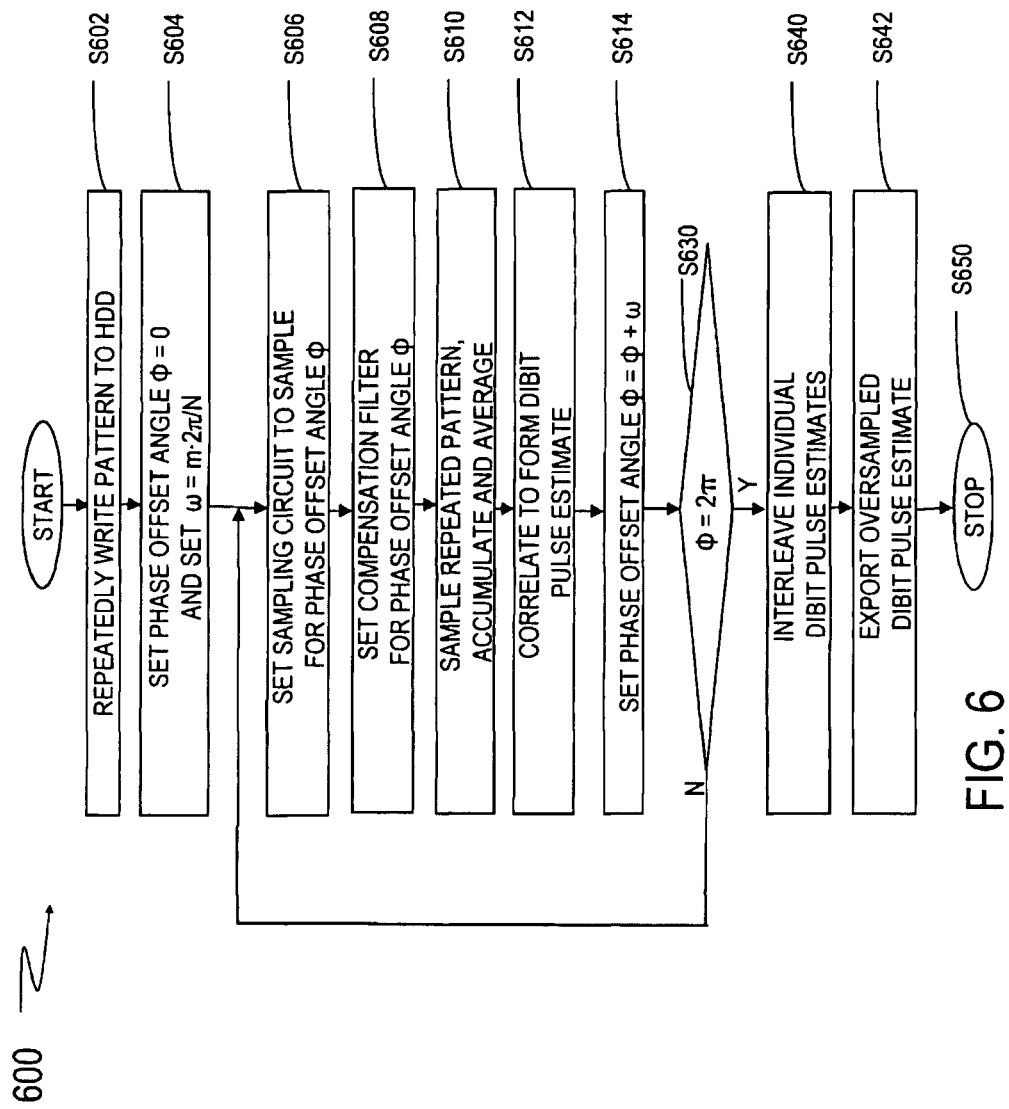
FIG. 6 is a flowchart outlining an exemplary process for estimating a dibit pulse response for a data storage device.

FIG. 6 is a flowchart outlining an exemplary process for estimating an oversampled dibit pulse response for a read channel of a magnetic HDD or other data storage device. The process starts in step S602 where one or more copies of a PRBS may be written to the memory medium of the data storage device, and the process goes to step S604. In step S604, a phase offset angle at which symbols are to be sampled may be set to $\Phi=0$ radians while a phase offset increment $\omega$ may be set to a desired value. As discussed above the effective oversampling rate N may determine the appropriate phase offset angular resolution. That is, for any oversampling rate N, phase offset angle $\Phi$ may be set to $m\cdot 2\pi/N$ radians where m is an integer such that $0 \leq m < N$. The process can then go to step S606.

In step S606, a sampling circuit coupled to the memory medium may be configured to generate PRBS ADC sample sets based on the current phase offset angle $\Phi$, thereafter the process can go to step S608. In step S608, the compensation filter may be set to compensate for any circuitry, such as the symbol timing loop and read circuit 120-R of FIG. 4, that might otherwise suffer performance degradation due to a non-zero phase offset angle $\Phi$, and the process can go to step S610.

In step S610, the one or more PRBS ADC sample sets may be generated based on the phase offset angle $\Phi$, after which the PRBS ADC samples are accumulated and synchronously averaged, and the process can go to step S612. In step S612, the averaged PRBS ADC samples may be correlated with the PRBS sequence to form a dibit pulse response estimate, and the process can go to step S614.

In step S614, the phase offset angle may be incremented to $\Phi=\Phi+\omega$, where $\omega=2\pi/N$, and the process can go to step S630. In step S630, a determination is made as to whether $\Phi=$symbol length $2\pi$, i.e., whether all the individual dibit pulse response estimates have been derived for all unique values of $\Phi$. If all the individual dibit pulse response estimates have been derived for all unique values of $\Phi$, then the process goes to step S642; otherwise the process goes back to step S606.

In step S640, the individual dibit pulse response estimates may be interleaved to form an N-fold oversampled dibit pulse response estimate, and the process can go to step S642. In step S642, the oversampled dibit pulse response estimate may be exported to an appropriate compensation device, and the process can go to step S650 where the process can stop.

In various embodiments where the above-described systems and/or methods may be implemented using a programmable device, such as a computer-based system or programmable logic, it should be appreciated that the above-described systems and methods may be implemented using any of various known or later developed programming languages, such as C, C++, FORTRAN, Pascal, VHDL and the like.

Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on a given storage medium, the storage medium may provide the information and programs to the device, thus enabling the device to perform the above-described systems and/or methods.

For example, if a computer disk containing appropriate materials, such as a source file, an object file, an executable file or the like, were provided to a computer, the computer may receive the information, appropriately configure itself and perform the functions of the various systems and methods outlined in the diagrams and flowcharts above to implement the various functions.

While the disclosed methods and systems have been described in conjunction with exemplary embodiments, these embodiments should be viewed as illustrative, not limiting. Various modifications, substitutes, or the like are possible within the spirit and scope of the disclosed methods and systems.

What is claimed is:

1. A receiving device, comprising:
    a data acquisition circuit configured to digitize symbol data received from a data channel;
    a dibit pulse estimation circuit coupled to an output of the data acquisition circuit and configured to estimate an oversampled dibit pulse response using symbol data sampled at substantially a symbol rate of the receiving device without increasing sampling frequency and to estimate multiple dibit pulse responses each derived using a different sampling phase, the dibit pulse estimation circuit including:
    a phase control circuit configured to control a phase offset angle sampling of the data acquisition circuit by changing a relative phase offset angle at which the data acquisition circuit samples symbols received from the data channel;
    an averaging circuit configured to average multiple sets of received samples to create an averaged sample sequence;

a correlation circuit configured to correlate the averaged sample sequence with a reference pseudorandom bit sequence to generate a dibit pulse response estimate; and an interleaving circuit configured to interleave the dibit pulse response estimate with one or more other dibit pulse response estimates generated based on different phase offset angle samplings; and a compensation circuit coupled to an output of the data acquisition circuit and configured to compensate for changes in sampling phase of the data acquisition circuit.

2. The receiving device of claim 1, wherein the averaging circuit includes an adding circuit configured to add respective samples of the multiple sets of received sample sequence to create a first accumulated sample sequence; and a second circuit configured to determine a first averaged sample from the first accumulated sample sequence.

3. A communications system incorporating the receiving device of claim 1.

4. A computing system incorporating the receiving device of claim 1.

5. The receiving device of claim 1, wherein the receiving device is incorporated into a read channel of a memory storage device.

6. The receiving device of claim 5, wherein the memory storage device is a magnetic hard disk system.

7. The receiving device of claim 5, wherein the oversampled dibit pulse response is estimated using a pseudorandom bit sequence stored in of the memory storage device.

8. The receiving device of claim 7, wherein the oversampled dibit pulse response is estimated using multiple copies of the pseudorandom bit sequence stored in the memory storage device.

9. The receiving device of claim 8, wherein the multiple copies of the pseudorandom bit sequence occupy substantially all of a data sector of the memory storage device.

10. The receiving device of claim 8, wherein the memory storage device has 32 copies of a 127-bit pseudorandom bit sequence stored therein.

11. The receiving device of claim 8, wherein the memory storage device has $2^N$ copies of a 127-bit pseudorandom bit sequence stored therein, wherein N is a positive integer.

12. A receiving device, comprising:
data acquisition means for sampling symbol data received from a data channel; and
estimation means coupled to the data acquisition means for estimating an oversampled dibit pulse response using symbol data sampled at substantially a symbol rate of the receiving device without increasing sampling frequency and to estimate multiple dibit else responses each derived using a different sampling phase, the estimation means including:
a phase control means for controlling a phase offset angle sampling of the data acquisition means by changing a relative phase offset angle at which the data acquisition means samples symbols received from the data channel an averaging means for averaging multiple sets of received samples to create an averaged sample sequence;

a correlation means for correlating the averaged sample sequence with a reference pseudorandom bit sequence to generate a dibit pulse response estimate; and an interleaving means for interleaving the dibit pulse response estimate with one or more other dibit pulse response estimates generated based on different phase offset angle samplings; and a compensation means coupled to an output of the data acquisition means and for compensating for phase offset angle sampling changes.

13. A computing system incorporating the receiving device of claim 12.

14. A magnetic disk drive incorporating the receiving device of claim 12.

15. A memory system, comprising:
a non-transitory memory medium having multiple copies of a pseudorandom bit sequence stored thereon;
a symbol timing loop and read circuit coupled to the non-transitory memory medium via a read channel, the symbol timing loop and read circuit configured to estimate an oversampled dibit pulse response using symbol data sampled at substantially a symbol rate of the read channel without increasing sampling frequency and to estimate multiple dibit pulse responses each derived using a different sampling phase, the symbol timing loop and read circuit including:
a data acquisition circuit configured to digitize multiple sets of samples received via the read channel;
a phase control circuit configured to control a phase offset angle sampling of the data acquisition circuit by changing a relative phase offset angle at which the data acquisition circuit samples symbols received from the read channel;
a compensation circuit coupled to an output of the data acquisition circuit and configured to compensate for changes in a phase offset angle sampling of the data acquisition circuit;
an averaging circuit configured to average multiple sets of received samples to create an averaged pseudorandom bit sequence;
a correlation circuit configured to correlate the averaged pseudorandom bit sequence derived from digitized sets of the received samples for multiple phase offset angles to produce multiple dibit pulse response estimates; and
an interleaving circuit configured to interleave the multiple dibit pulse response estimates generated based on different phase offset angle samplings.

16. The memory system of claim 15, wherein the non-transitory memory medium is a magnetic hard disk.

17. A computing system incorporating the memory system of claim 15.

18. A method for estimating a dibit pulse response, comprising:
receiving, by a data acquisition circuit, symbols from a data channel;
producing oversampled received symbol data using received symbols sampled at substantially a symbol rate of the received symbols without increasing sampling frequency; and
estimating the dibit pulse response based on the oversampled received symbol data by estimating multiple dibit pulse responses each derived using a different sampling phase;
controlling a phase offset angle sampling of the data acquisition circuit by changing a relative phase offset angle at which the data acquisition circuit samples symbols received from the data channel;
averaging multiple sets of received samples to create an averaged sample sequence;

correlating the averaged sample sequence with a reference pseudorandom bit sequence to generate a dibit pulse response estimate;

interleaving the dibit pulse response estimate with one or more other dibit pulse response estimates generated based on different phase offset angle samplings; and compensating for changes in sampling phase of the data acquisition circuit.

19. The method of claim 18, wherein the received symbols correspond to one or more sets of received samples.

20. The method of claim 19, wherein the producing comprises:

generating a plurality of phase offset angles; and sampling the received symbols based on each of the phase offset angles to generate a plurality of sampled received data.

21. The method of claim 20, wherein the estimating comprises:

estimating a dibit pulse response for each of the sampled received data; and interleaving estimated dibit pulse responses corresponding to the phase offset angles to form an interleaved estimated dibit pulse response.

22. A method for estimating a dibit pulse response of a data channel, comprising:

first receiving sets of samples by a data acquisition circuit from the data channel at a read symbol rate using a first phase offset angle to produce a first sampled output;

estimating a first dibit pulse response using the first sampled output;

deriving an oversampled dibit pulse response estimate using the estimated first dibit pulse response without increasing sampling frequency by estimating multiple dibit pulse responses each derived using a different sampling phase;

controlling a phase offset angle sampling of the data acquisition circuit by changing a relative phase offset angle at which the data acquisition circuit samples symbols received from the data channel and to estimate multiple dibit pulse responses each derived using a different sampling phase;

averaging multiple sets of received samples to create an averaged sample sequence;

correlating the averaged sample sequence with a reference pseudorandom bit sequence to generate a dibit pulse response estimate;

interleaving the dibit pulse response estimate with one or more other dibit pulse response estimates generated based on different phase offset angle samplings; and compensating for changes in sampling phase of the data acquisition circuit.

23. The method of claim 22, further comprising:

second sampling the one or more sets of received samples received via the data channel at the read symbol rate using a second phase offset angle different from the first phase offset angle to produce a second sampled output; and estimating a second dibit pulse response using the second sampled output, wherein the oversampled dibit pulse response estimate is derived using the estimated second dibit pulse response.

24. The method of claim 23, further comprising:

third sampling the one or more sets of received samples received via the data channel at the read symbol rate using a third phase offset angle different from the first and the second phase offset angles to produce a third sampled output; and estimating a third dibit pulse response using the third sampled output, wherein the oversampled dibit pulse response is derived using the estimated third dibit pulse response.

25. The method of claim 23, further comprising compensating for sampling sets of received samples while using a non-zero symbol phase offset angle.

26. The method of claim 23, further comprising interleaving the estimated first and second dibit pulse response.

27. The method of claim 23, wherein the first sampling includes sampling multiple received samples.

28. The method of claim 27, wherein the estimating the first dibit pulse response includes:

averaging multiple sets of received samples of the first sampling to create a first averaged sequence; and correlating the first averaged sequence with a reference pseudorandom bit sequence.

29. The method of claim 28, further comprising interleaving the estimated first and second dibit pulse responses to obtain an interleaved dibit pulse response estimate.

* * * * *